INVENTOR
Maxwell H. Hill
BY
his ATTORNEY

Fig. 3

Dec. 25, 1934.  M. H. HILL  1,985,409
METHOD OF AND MACHINE FOR CHAMFERING GEARS
Filed Aug. 10, 1931   6 Sheets-Sheet 4

INVENTOR
Maxwell H. Hill.
BY
his ATTORNEY

Dec. 25, 1934.　　　　　M. H. HILL　　　　　1,985,409
METHOD OF AND MACHINE FOR CHAMFERING GEARS
Filed Aug. 10, 1931　　　6 Sheets-Sheet 5

INVENTOR
Maxwell H. Hill.
BY
his ATTORNEY

Dec. 25, 1934.  M. H. HILL  1,985,409
METHOD OF AND MACHINE FOR CHAMFERING GEARS
Filed Aug. 10, 1931  6 Sheets-Sheet 6

INVENTOR
Maxwell H. Hill.
BY
his ATTORNEY

Patented Dec. 25, 1934

1,985,409

UNITED STATES PATENT OFFICE 1,985,409

METHOD OF AND MACHINE FOR CHAMFERING GEARS

Maxwell H. Hill, Rochester, N. Y., assignor to Gleason Works, Rochester, N. Y., a corporation of New York Application August 10, 1931, Serial No. 556,135

22 Claims. (Cl. 90—1)

The present invention relates to a method of and to apparatus for chamfering gears. While the invention may be employed in the chamfering of various types of gears, its primary application is to the chamfering of spiral bevel and hypoid gears.

In spiral bevel and hypoid gears, the concave sides of the teeth form an acute angle with the outer end surface of the teeth and the convex sides of the teeth form an acute angle with the inner end surface of the teeth. In use it has been found that the corners of the teeth formed by the described acute angular junction of the two sides with the opposite end faces of the teeth tend to break off, even though the gears have been hardened, and the chips formed by breakage get in between the teeth of the gears, causing noise, wear and often-times serious damage. It is, therefore, the practice in manufacturing spiral bevel and hypoid gears to chamfer the ends of the teeth. In some shops, this is done only at the outer ends because the lengthwise curvature of the teeth is such that breakage is only likely to occur there, but in many cases, it is necessary to chamfer both ends.

In some plants, it is the practice to produce the chamfer by manually filing off the offending corners of the teeth. In others, the large ends of the teeth are chamfered in a hobbing process with specially designed hobs, but as the hobbing operation does not lend itself readily to the chamfering of the corners at the small ends of the teeth, filing or some other method must be resorted to, if these corners are required to be removed also. In my pending application No. 522,538 of March 14, 1931, I have disclosed an attachment for machines for rough cutting ring gears which will chamfer the outer ends of the gear teeth, but this attachment will not chamfer pinions or the inner ends of the teeth of a gear. Machines have been designed for chamfering both ends of the gear teeth, but these have proven slow or generally unsatisfactory in operation.

One purpose of the present invention is to provide an improved method of chamfering the corners of gear teeth. A further purpose is to provide a machine which will be simple in construction and fast in operation and on which both ends of the teeth of either a spiral bevel or hypoid gear or a spiral bevel or hypoid pinion can be chamfered simultaneously.

In a machine built according to a preferred embodiment of the present invention, there are two tools employed, one for chamfering each end of the teeth. The chamfering operation is effected by moving each tool in an arc in the general direction of the tooth profile. For this purpose, the two tools are oscillated about axes inclined both to the end and top surfaces of the teeth. They cut simultaneously, each tooth cutting on its stroke in one direction and being out of engagement with the gear on its return stroke.

The work may be indexed from tooth to tooth in any suitable manner, but I have developed a novel work drive, which eliminates special indexing mechanism and reduces the time loss of indexing. This drive constitutes an additional novel feature of my machine. The work spindle is driven at a varying velocity. It revolves slowly during the chamfering cut and at a relatively high speed during the return stroke of the tool, thereby indexing the work between successive cutting strokes.

One passage of a tool over a tooth profile is ordinarily sufficient for removing the corner which requires chamfering so that the chamfering operation on a gear or pinion is ordinarily completed when the gear or pinion has made one revolution. On some large jobs, however, it may be necessary to take more than one cut to effect the desired chamfer and on such jobs, therefore, the work will be rotated through more than one revolution.

As already stated, the invention has particular application to the chamfering of the teeth of spiral bevel and hypoid gears and it is in connection with such an application that the invention is illustrated in the accompanying drawings.

In the drawings, 20 designates the base or frame of the machine. The work head 21 and the two tool heads 22 and 22′ are adjustably mounted upon this base or frame 20.

The frame is formed at its upper end with guide-ways 24, 24 which extend along the two sides of the frame for a part of its length (Figure 3). 25 designates a slide which is movable on the upper face of the frame 20 and which is guided in its movement by the guide-way 24 and the gibs 26 which engage the under face of the guide-way 24 and which are secured to the slide 25 by the screws 27. The slide 25 is operated manually through a hand-lever 30 (Fig. 3) which is secured, externally of the frame, to a rock-shaft 31 that is journaled in the frame. An arm 32 is fixedly secured to the rock shaft 31 within the frame 20. A link 33 connects this arm with a block 34 that is secured to the slide 25 in any suitable manner and which extends downwardly through a slot (not shown) in the upper face of the frame 20. As is evident, when the lever 30 is manipulated, the slide 25 may be moved in either direction on the ways 24. Thus the work head may be moved into operative position to allow chamfering of a gear or moved away again to loading position to permit removal of a chamfered gear and chucking of a new work-piece, as will hereinafter be more fully described. Any suitable form of stop (not shown) may be provided to limit these movements.

The work head 21 is adjustable on the slide 25 angularly and axially. The angular adjustment permits inclining the gear to be chamfered to the desired angle with reference to the chamfering tools in accordance with its pitch cone angle while the axial adjustment is for gears of different cone distances.

Figures 2, 11:
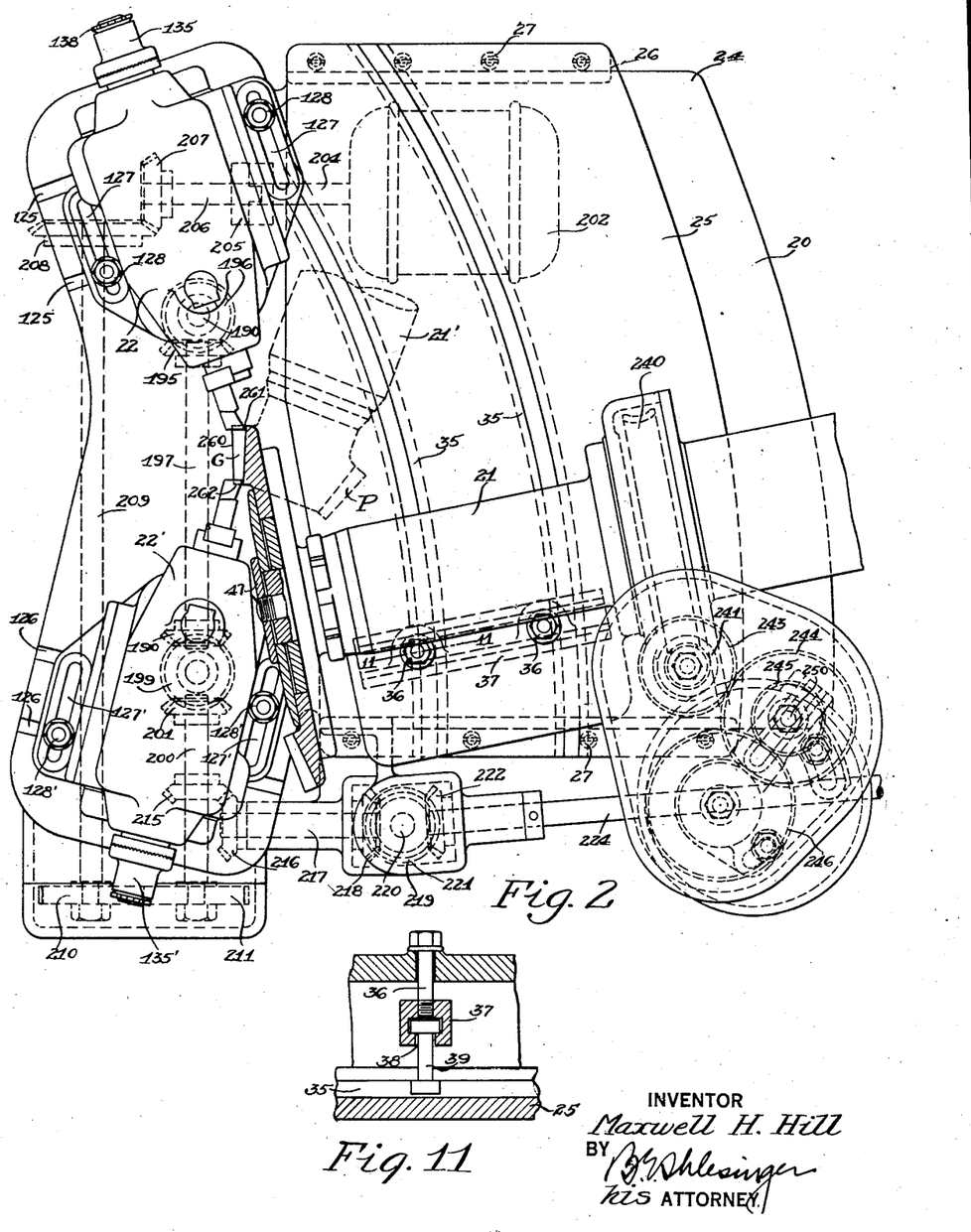
Figure 2 is a plan view of this machine, showing the chamfering of the gear teeth and indicating in dotted lines how the machine may be employed for chamfering the teeth of pinions.
Figure 11 is a section on the line 11—11 of Figure 2, showing how the work head is secured in adjusted position.

The slide 25 is formed on its upper face with arcuate T-slots 35. The work head 21 carries two bolts 36 which thread adjustably into a bar 37 (Fig. 11). This bar is formed on its lower face with a T-slot 38. 39 designates a bolt, one head of which engages in the T-slot 38 and the other head of which engages in a T-slot 35. When the bolts 36 are released, the lower ends of the bolts 39 will slide in the arcuate slots 35 enabling the desired angular adjustment to be made and at the same time, the upper heads of these bolts 39 will slide in the bar 37, enabling the desired in and out or axial adjustment to be made. When the bolts 36 are tightened, the lower heads of the bolts 39 grip the slots 35 and the bar 37 is drawn into gripping engagement with the upper heads of the bolts 39. Thus by manipulating the bolts 36, the work head can be secured in its two positions of adjustment.

The work head 21 is formed with a bearing portion 40 in which the work spindle 42 is journaled. The gear or pinion to be chamfered can be secured to the work spindle by any suitable type of chucking mechanism.

The chucking mechanism shown in the drawings is of the type covered by U. S. Patent No. 1,808,347 issued June 2, 1931. It forms no part of the present invention and need only be briefly described here, therefore. The work spindle 42 is formed with a taper bore to receive the correspondingly tapered stem of an arbor 44. The gear G to be chamfered is mounted on this arbor, being centered thereon by the centering plate 45 and being clamped thereon by the clamping disc 46. The disc 46 is held in clamping position by the head 47 of a draw-bar 48. The draw-bar 48 is formed in two parts which are threaded together. It is movable axially of the spindle for clamping or release through aligned openings formed in the arbor 44 and in the spindle and is secured at its rear end to a piston 50 by the nut 51, disc 52 and washer 53.

The piston 50 reciprocates in a cylinder 54 which is threaded on the rear end of the work spindle 42. The draw bar 48 is constantly urged into chucking position by a coil spring 55. This spring is interposed between the piston 50 and the head of a hardened bearing member 56 which is secured in a recess in the work spindle. The chuck is released by application of fluid pressure to the rear end of the piston 50. For this purpose a plunger-pump 60, such as described in Patent No. 1,808,347 above mentioned, is provided. This pump is mounted upon a bracket 61 which is secured to the base 20 of the machine at one side thereof. 62 designates a foot-pedal which is pivotally connected at 63 to the bracket 61 and at 64 to the plunger 65 of the pump 60. When the pedal 62 is depressed, the pressure fluid is forced out of the pump 60 through the flexible hose 66, the duct 67 in the sleeve 68, and the ducts 69 and 70 in the stud 72 against the rear face of the piston 50, compressing the spring 55 and releasing the gear G.

The stud 72 is mounted in the rear end of the cylinder 54. The sleeve 68 is rotatably mounted on a bearing-surface formed on the rear end of the cylinder 54 and on a bearing surface formed on the bushing 73 which is secured to the stud 72 by the nut 74 and washer 75. The sleeve 68 allows of fluid-connection between the hose 66 and the stud 72 in any indexed position of the work spindle 42.

The two tool heads are each adjustable on the base 20 in two directions at right angles to one another and in addition have, also, a limited angular adjustment on the base. For convenience, the adjustments of one head are in directions inclined to the directions of adjustment of the other head, thereby to permit bringing the two tools more readily into the proper operative relation with the gear to be chamfered. Thus the upper face of the frame 20 of the machine is formed with two pairs of T-slots 125 and 126. The slots 125 of one pair are inclined to the slots 126 of the other pair. Each of the heads 22 and 22′ is formed with base portions which are provided with elongated slots 127 for the head 22 and 127′ for the head 22′. T-bolts 128 pass through the slots 127 and T-bolts 128′ pass through the slots 127′ and the heads of these bolts engage, respectively, in the slots 125 and 126. By manually sliding the two heads on the upper face of the frame, each can be adjusted in two directions at right angles. Moreover, by reason of the length of the slots 127 and 127', the two heads can be adjusted angularly within limits on the base. The bolts 128 or 128' serve to secure them in their adjusted positions.

Aside from the differences noted with reference to their adjustments, the two tool heads 22 and 22' are identical in construction and operation. One only will be described here in detail, corresponding parts of the other bearing corresponding reference numerals which are primed.

Each cutting tool is secured to an oscillatory spindle that is rocked to effect the cutting operation. 130 designates one of the tool spindles. It is journaled at its forward end in a suitable bearing 131 in the tool head 22. The rear end of this tool spindle is of reduced diameter and is mounted rotatably in a sleeve 132 that is journaled in a suitable bearing 133 in the head 22. The front end of the spindle 130 is notched or recessed to receive the tool arm or block 140. The tool T for chamfering one end of the teeth of a gear is secured in a recess in this tool block by a set screw 141. The tool block is formed with an elongated slot 142. A clamping bolt 143 passes through this slot to secure the tool arm to the tool spindle 130. Through the bolt and slot connection between the tool head and the tool spindle, the tool T can be adjusted radially of the spindle to control the curvature of the chamfering cut, as determined by the profile curvature of the teeth to be chamfered.

The tools T and T' are side cutting tools, each provided with a cutting edge at one side. The non-cutting side 145 of the tool may be flat, as shown in the drawings while the cutting side 148 will preferably be beveled, as shown, to provide a cutting edge having a suitable pressure angle. The front face 146 of the tool is formed with a suitable shear angle and the cutting edge 147 of the tool is formed by the acute angular junction of this front face with the side surface 148. The top surface 149 and side surface 148 of the tool are relieved back of the cutting edge.

The chamfering cut is effected by oscillating the tool spindle. This oscillatory motion is produced by rocking the sleeve 132 which is keyed at 150 to the tubular portion 151 of an arm 152. The arm 152 is slotted at 153 to receive the sliding block 154. The arm 152 is connected through the block 154, the bushing 155 and the pin or bolt 156 with the crank-plate 158.

The crank-plate 158 is formed as part of a shaft 160 which is mounted in anti-friction bearings 162 and 163 in the head 22. The shaft 160 is driven from the shaft 165 through the bevel gearing 166, 167.

The rear face of the sleeve 132 is formed with clutch teeth 134. 135 designates a cooperating clutch member which is keyed to the spindle 130. When the clutch teeth are in engagement, the spindle 130 and sleeve 132 are locked together. When the nut 136 is released, the clutch teeth are disengaged through operation of the spring 137 and the spindle 130 can be adjusted angularly in the sleeve 132 to adjust the position of the tool angularly relative to the arc of swing of the tool spindle.

The throw or stroke of the cutting tool can be adjusted by adjustment of the crank pin 156 which is a T-bolt and which has its head in engagement with the T-slot 168 that is formed radially in the face of the crank plate 158.

Each tool cuts on its stroke in one direction and is withdrawn from engagement with the work on its return stroke. The means for moving the tool alternately to and from cutting position will now be described.

Figures 4, 5, 7:
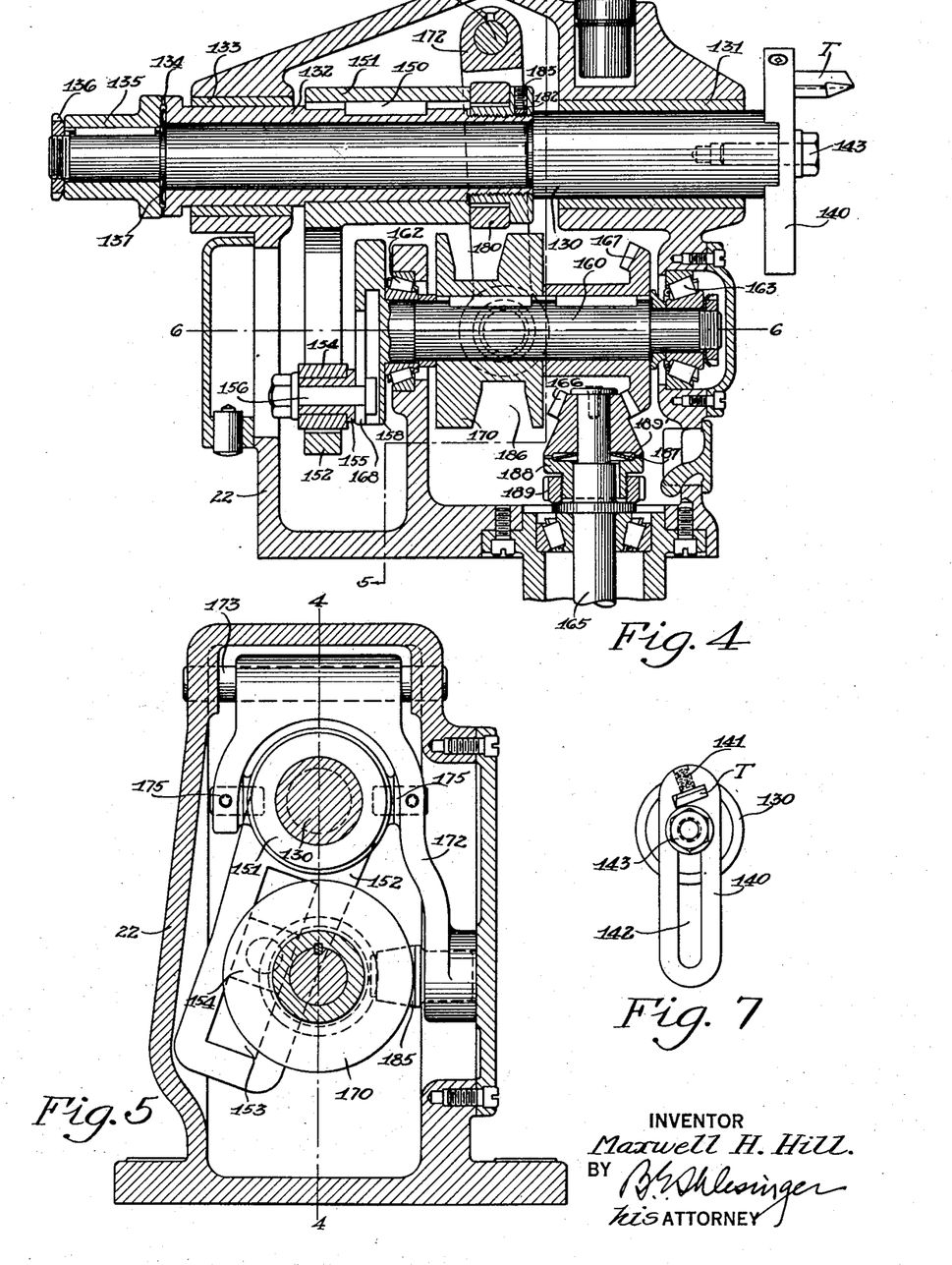
Figure 4 is a vertical sectional view through one of the tool heads, this view being taken on the line 4—4 of Figure 5.
Figure 5 is a section on the line 5—5 of Figure 4, looking in the direction of the arrows.
Figure 7 is a front elevation of a tool and tool block.
Figure 6:
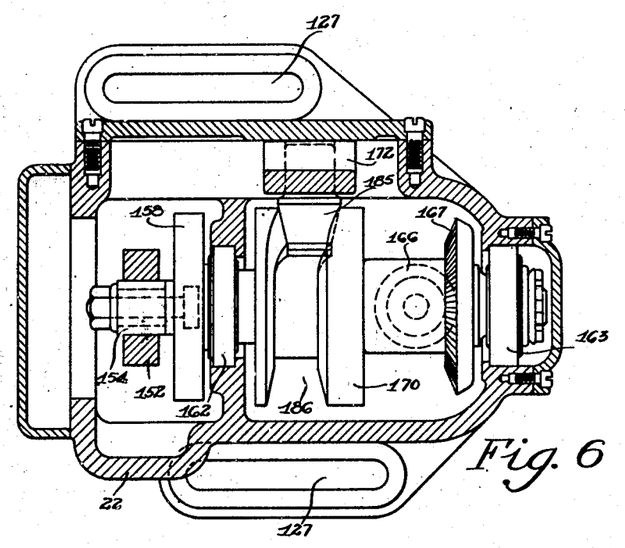
Figure 6 is a transverse section through the tool head taken on the line 6—6 of Figure 4.

170 designates a cam that is keyed to the shaft 160 and is held against axial movement thereon between the roller bearing 162 and the hub of the bevel gear 167. 172 designates a yoke-member which is pivotally mounted upon a stud 173 that is secured in the sides of the head 22. This yoke-member 172 is forked and carries pins 175 (Fig. 5) that engage on either side of the shaft 130 in holes (not shown) in a ring member 181. The ring member 181 is secured against axial movement relative to the shaft 130 by the nut 182 which threads onto the sleeve 132 and is secured in adjusted position by the set screw 183.

One arm of the yoke-member 172 carries at its lower end a roller 185 which engages in the cam slot 186 of the cam 170. The cam slot 186 is so formed that the cutting tool is moved into engagement with the gear blank at the beginning of the cutting stroke and withdrawn from engagement with the gear blank at the beginning of the return stroke. Preferably, the cam trackway is so formed that there are dwells in the axial movements of the tool spindle during actual cutting and during the return stroke of the tool. As each of the tool heads is constructed alike, it will be seen that the two tools are simultaneously fed into engagement with teeth of the gear to be chamfered, take their cuts, are withdrawn, and then rocked back to initial position.

To allow the feed and withdrawal movements to occur at the desired points in the cycle, the bevel pinion 166 is adjustably connected with the shaft 165, its hub being formed with clutch teeth 187 on the lower face which are engageable with the opposed teeth of a clutch member 188 that is keyed to the shaft 165. The clutch member 188 can be moved to and from clutched position by rotation of the nut 189 while the spring 189' serves to open the clutch when it is released. The nut 189 threads on the hub of the clutch member 188.

Figure 1:
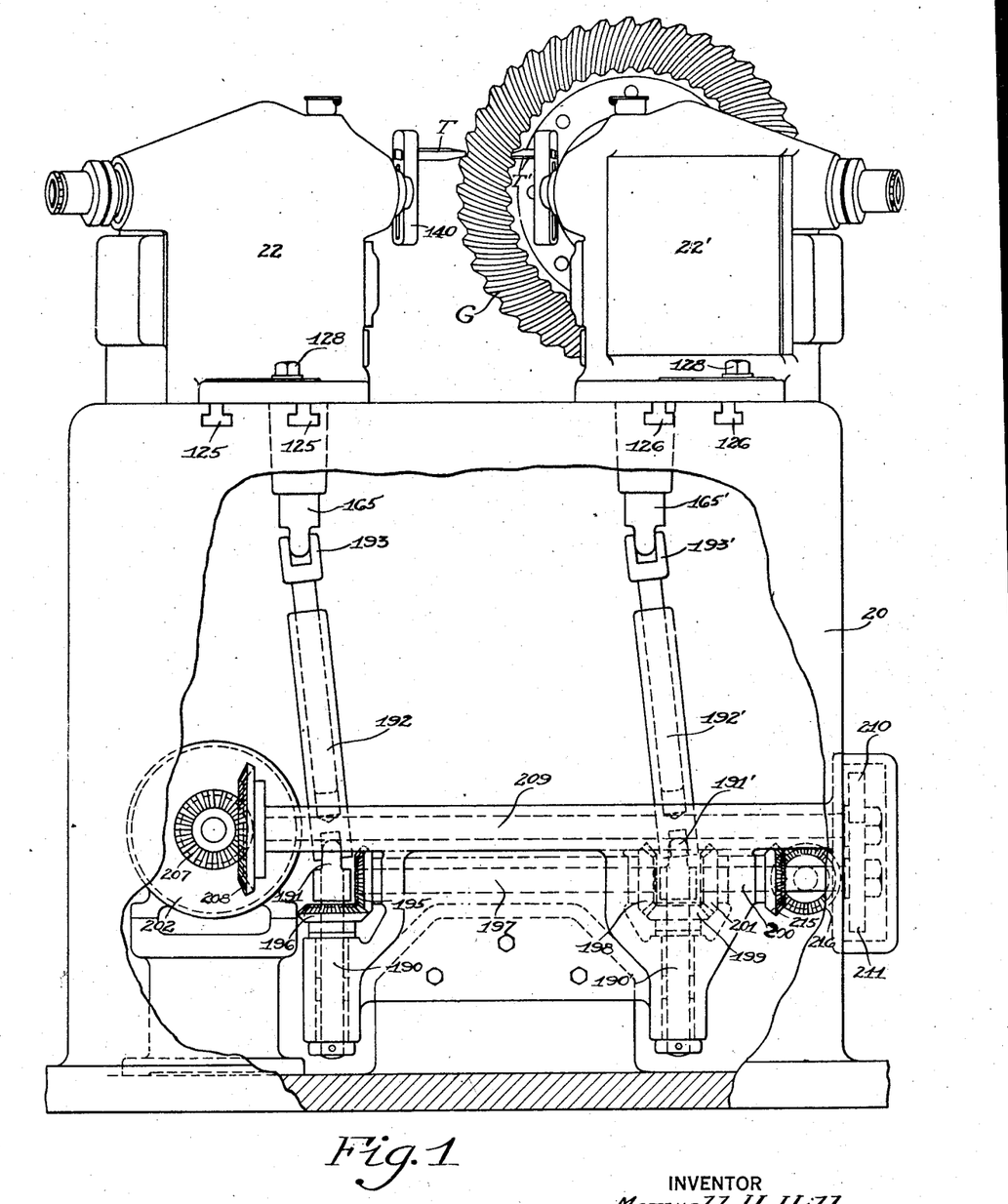
Figure 1 is a side elevation, with parts broken away, of a machine constructed according to a preferred embodiment of this invention and set up for chamfering both ends of the teeth of a spiral bevel gear.

The shafts 165 and 165' which operate the crank and cam drives of the two tool heads are driven from shafts 190 and 190', respectively, (Figure 1) which are connected with the shafts 165 and 165', respectively, by the universal joints 191 and 191', respectively, the telescoping shafts 192 and 192', respectively, and universal joints 193 and 193', respectively, the primed numerals designating the parts driving the shaft 165' while the other numerals designate the parts driving the shaft 165.

The shaft 190 is driven by the bevel bearing 195 and 196 from the shaft 197. This shaft 197 carries a bevel gear 198 that meshes with a bevel gear 199 on the shaft 190'. The shaft 190' is driven from the shaft 200 through a bevel gear 201 which meshes with the bevel gear 199. The shaft 200 is driven from a motor 202 (Figs. 1 and 2) through the shaft 204, the coupling 205, the shaft 206, the bevel pinion 207, the bevel gear 208 which meshes therewith, the shaft 209 and the change gears 210 and 211.

The work might be held stationary during a chamfering cut and indexed after each cutting stroke or after a series of cutting strokes. In either case, any usual or suitable type of indexing mechanism may be employed for indexing the work spindle. In practise, I have found that a suitable chamfer can be effected on a single stroke of a cutting tool. I, therefore, prefer to use the indexing mechanism illustrated in the accompanying drawings and rotate the blank continuously, revolving it rapidly between cuts to effect indexing. The mechanism for rotating and indexing the blank will now be described.

Figure 3:
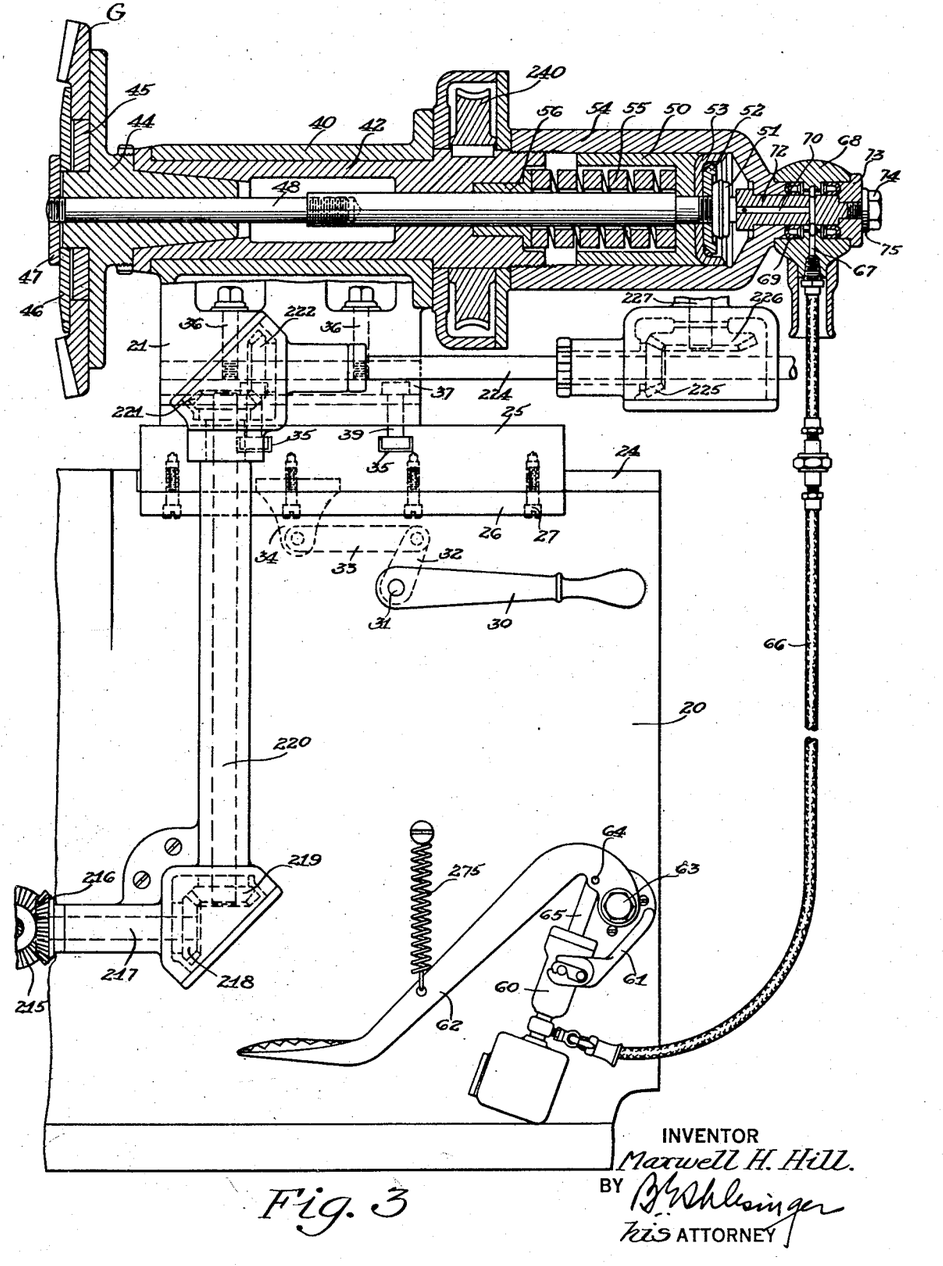
Figure 3 is a fragmentary view at right angles to Figure 1, showing the mounting of the work and parts of the drive to the work spindle.

Secured to the shaft 200 (Figs. 1 and 2) is a bevel gear 215 which meshes with a bevel gear 216 that is secured to one end of a shaft 217. At its opposite end, the shaft 217 carries a bevel gear 218 which meshes with a bevel gear 219 that is secured to the lower end of a vertical shaft 220 (Fig. 3). Fastened to the upper end of the shaft 220 is a bevel gear 221. This bevel gear meshes with a bevel gear 222 which is secured to an elongated shaft 224 that has a splined connection (Figs. 8 and 10) with a bevel pinion 225.

Figure 8:
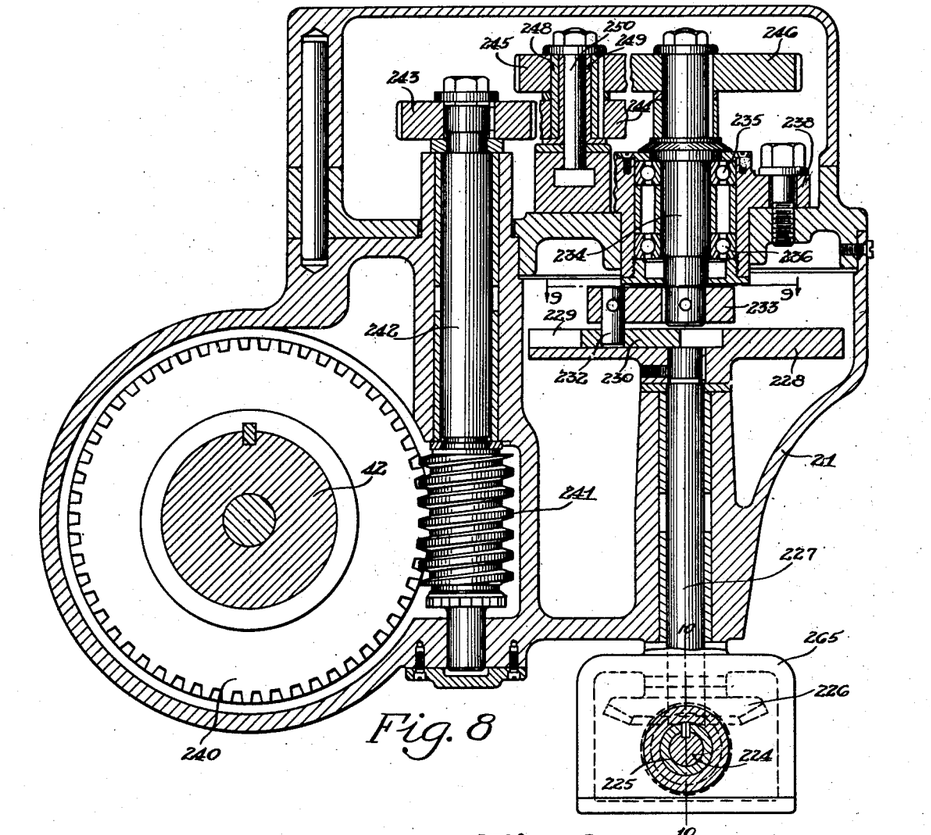
Figure 8 is a vertical sectional view showing details of the work spindle drive.
Figures 9, 10:
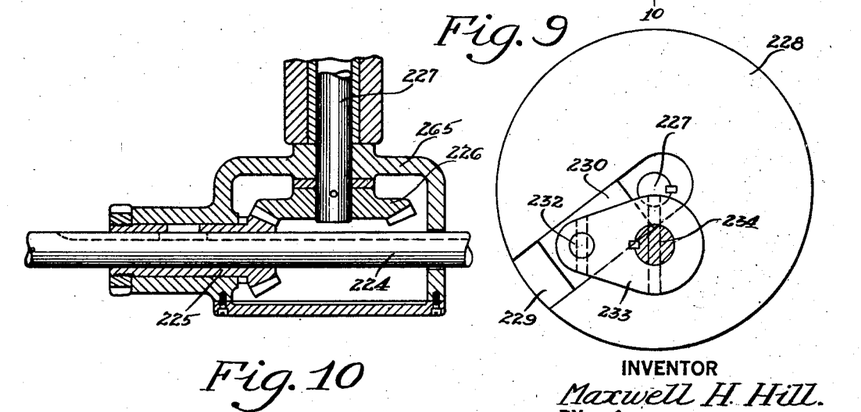
Figure 9 is a section on the line 9—9 of Figure 8, looking in the direction of the arrows.
Figure 10 is a fragmentary sectional view, taken on the line 10—10 of Figure 8.

The bevel pinion 225 meshes with a bevel gear 226 which is secured to the lower end of the spindle 227 that is journaled in suitable bearings in the work head 21. Keyed to the upper end of the shaft 227 is a plate 228 (Figs. 8 and 9). This plate is formed with a radial slot 229. A block 230 slides in the slot 229. It is connected by a pin 232 with an arm 233. The arm 233 is keyed to a shaft 234 which is journaled in bearings 235 and 236 in a change gear quadrant 238.

The plate 228 will drive the shaft 234 at a varying velocity through the block 230, pin 232 and arm 233. These parts are so adjusted that the blank rotates slowly during the cutting strokes of the tools and rapidly during their return strokes, the blank being indexed on the return strokes.

The work spindle 42 is rotated from the shaft 234 through the worm wheel 240 which is keyed to the work spindle, the worm 241 which meshes with the worm wheel, the worm shaft 242 and the change gearing 243, 244, 245 and 246. The change gear 243 is keyed to the upper end of the index worm shaft 242 and the change gear 246 is keyed to the upper end of the shaft 234. The change gears 244 and 245 are keyed to a sleeve 248 that is mounted upon a bushing 249 which is adjustably secured to the quadrant 238 by the T-bolt 250.

The use and operation of the machine will now be described. The cutting tools T and T' may be sharpened and arranged either to cut on their down strokes or on their up strokes, or, in fact, one tool may be arranged to cut on the down stroke and the other on the up stroke. Whatever the arrangement, both cut simultaneously. Preferably they are so arranged with reference to the blank that each takes a diagonal cut over the tooth profiles, the cut beginning or ending, depending upon the direction of cutting stroke, at about the end of the tooth at the root line thereof and extending diagonally upwardly across the tooth profile. Thus triangular shaped chips are removed from the two ends of the gear teeth. This kind of a cut can be obtained by adjusting the tools and work head so that the axes about which the tools swing are inclined, respectively, to the top surface 260 and opposite end faces 261 and 262, respectively, (Fig. 2) of the teeth.

The tool heads 22 and 22' are adjusted by sliding them on the top of the frame 20 and are secured in the desired positions of adjustment by the bolts 128 and 128', which pass through the slots 127 and 127', respectively, and engage in the slots 125 and 126, respectively. The work head is adjusted to the desired position by moving the head 21 angularly and axially on the slide 25. After adjustment, the work head is secured in its adjusted position by threading up on the bolts 36 to cause the bar 37 to clamp the upper head of the bolt 39 and the lower head of these bolts to clamp the T-slots 35. In Figure 2 of the drawings, there is shown in full lines the position of the work head when a gear is to be chamfered. The position into which the work head would be adjusted for chamfering of a pinion is indicated in dotted lines at 21', the pinion being designated at P. It will be noted that with this particular combination, the tools might occupy the same position for chamfering the pinion P as they occupy when chamfering the gear G. The combined adjustments provided for tools and work enable a very wide range of gears to be chamfered on one machine.

Before starting up the machine, the tool arms 140 and 140' are adjusted on their respective tool spindles to offset the cutting edges of the tools the desired radial distances from the axes of these spindles in accordance with the desired curvature of the chamfering cut. This will depend upon the profile curvature of the tooth of the gear or pinion to be chamfered. In setting up the machine, also, the tool spindles 130 will be rotatably adjusted in their respective sleeves 132 in order to get the required effective length of cutting strokes. This adjustment is effected by releasing the clutch members 135 and rotatably adjusting the tool spindles 130 in the sleeves 132. The length of the cutting stroke of each tool is adjusted by adjusting the bolts 156 in the radial slots 168 of the crank plates 158. The points at which the tools engage with and are withdrawn from contact with the gear can be determined by rotatably adjusting the shafts 160 with relation to the shafts 165 after disconnecting the clutch members 188 from the bevel pinions 166.

The change gears 243, 244, 245 and 246 are selected in accordance with the number of teeth in the gear or pinion to be chamfered. The pinion 225 (Fig. 10) is journaled in a bracket 265 which is rotatably adjustable upon the shaft 227. By withdrawing the splined shaft 224 from engagement with the pinion 225, the bracket 265 can be rotated through an arc of 180°. In one position of its adjustment, the pinion 225 will rotate the work spindle in the proper direction for chamfering a gear of right-hand curvature. In the other position of its adjustment, the direction of rotation will be suitable for gears of left-hand curvature.

When all the parts have been correctly adjusted and the gear or pinion to be chamfered has been chucked on the work spindle, the work head slide 25 is moved inwardly, by rotating the hand lever 30, to bring the gear or pinion into operative relation with the tool.

The motor 202 is now started. This drives the shaft 160 through the bevel gearing 207, 208, the shaft 209, the change gears 210 and 211, the shaft 200, the bevel gearing 201, 199 and 198, the shaft 197, the bevel gearing 195 and 196 and the gearing and shafting connecting the gears 196 and 199 with the respective shafts 160 of the two tool heads. In the case of the head 22, this latter gearing and shafting includes the shaft 190, the universal joint 191, the telescoping shaft 192, the universal joint 193, the shaft 165, the clutch 189 and the bevel gearing 166 and 167. A similar chain of gearing drives the shaft 160 of the other tool head.

The rotation of the shaft 160 rotates the cam 170 and the crank plate 158. As the cams 170 rotate, the tools T and T' are moved into engagement with the teeth of the gear or pinion to be chamfered, the cams 170 in their rotation rocking the yokes 172 to reciprocate the sleeves 132 and with these the tool spindles 130. The yokes are connected through the pins 175 and the rings 180 with the sleeves 132. The rotation of the crank plates 158 cause the tools to be rocked on their axes, each crank plate being connected to the sleeve 132 through the arms 151, the blocks 154 and the bolts 156 and each sleeve 132 being connected with the corresponding tool spindle 130 by the clutch member 135.

As the tools take their cuts up or down the tooth profiles, the gear or pinion being chamfered, which is rotating continuously, is slowed down. The drive to the work spindle is from the shaft 200 through the bevel gearing 215, 216, the shaft 217, the bevel gearing 218, 219, the shaft 220, the bevel gearing 221, 222, the shaft 224, the bevel gearing 225, 226, the shaft 227, the plate 228, the block 230, the pin 232, the arm 233, the shaft 234, the change gears 246, 245, 244, 243, the shaft 242, the worm 241 and the worm wheel 240.

Figures 12, 13, 14, 15:
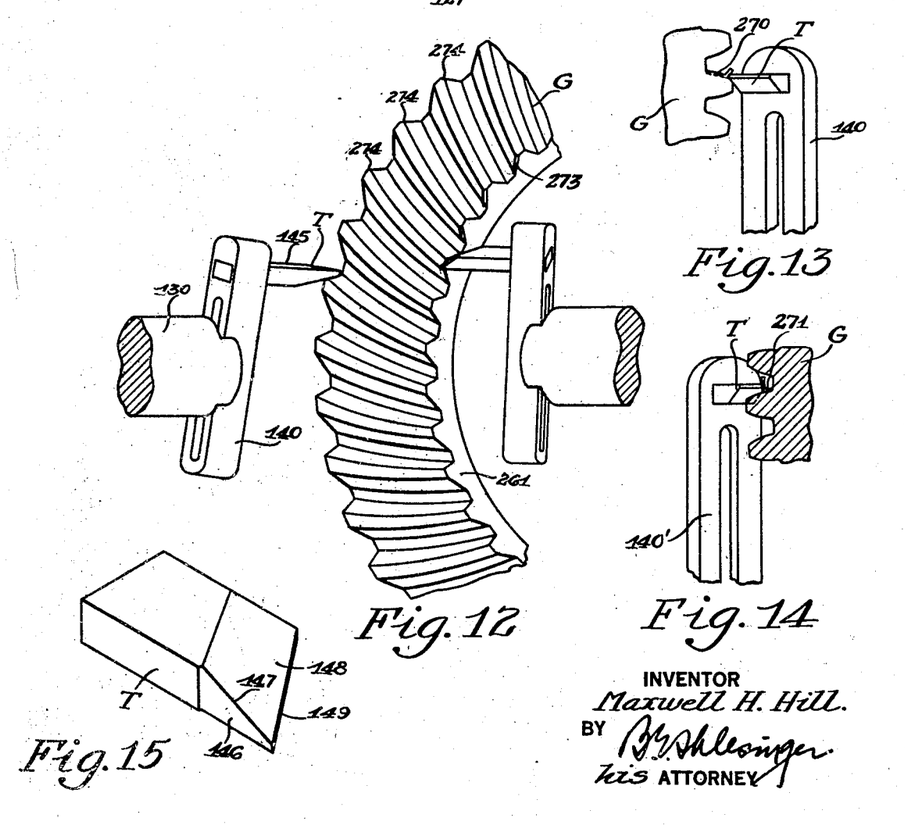
Figure 12 is a diagrammatic view on an enlarged scale, and illustrating the method of chamfering the teeth according to this invention.
Figure 13 shows the nature of the chamfering cut and the chamfering of the large end of the teeth of the gear shown in Figure 12.
Figure 14 illustrates diagrammatically the movement of the tool in the chamfering of the small end of the teeth of the gear shown in Figure 12.
Figure 15 is a perspective view of one of the tools.

The cutting tools T and T' moving across the profiles of the teeth of the rotating gear or pinion being chamfered, cut away the opposite corners of opposite ends of the tooth. Figures 13 and 14 show the nature of the chamfering cuts. 270 and 271 are, respectively, the chips removed from the opposite sides of the teeth at opposite ends thereof. The numeral 273 in Figure 12 indicates the chamfered portions of the inner ends of already chamfered teeth of the gear G, while the numeral 274 designates the chamfered portions of the outer ends of already chamfered teeth of the gear.

The tools rock down the tooth profiles of the gear or pinion being chamfered, taking their cuts and then are withdrawn from engagement with the gear or pinion and are rocked back to initial position. At the moment of withdrawal, the block 230 sliding in the slot 229 of the plate 228 will have reached a position where the plate 228 begins to accelerate the rotation of the shaft 234 and during the time that the tools are being withdrawn and being returned to initial position, the shaft 234 will be driven at a relatively high speed thereby effecting indexing of the work spindle. When the blank has been indexed, the tools are again fed into engagement with the gear or pinion to chamfer opposite ends of the next tooth or teeth of the gear or pinion. In the drawings, the tools are shown as operating simultaneously on opposite sides of different teeth of the blank. It will be understood, that they might be positioned to operate simultaneously on opposite sides of the same tooth.

When all of the teeth have been chamfered, the operator swings the lever 30 (Fig. 3) downwardly, withdrawing the work head slide from operating position to loading position. He can simultaneously stop the motor 202. He then steps on the foot pedal 62 to release the chuck. Oil is forced by this action out of the pump 60 through the line 66 into the cylinder 54 to compress the spring 55 and force the draw bar 48 forward into released position. The clamping disc 46 is removed and the gear G which has been chamfered is slipped off the arbor 44. A new gear is then placed on the arbor, the clamping disc 46 is replaced and the foot pedal 62 is released. The spring 275 raises this pedal up and through the action of this spring and the spring 55, the pressure fluid is forced out of the cylinder 54 and the new gear is chucked. The operator moves the new gear into position to be chamfered by swinging the lever 130 upwardly to the position shown in Figure 3.

The present invention is not confined to the chamfering of spiral bevel or hypoid gears, but may be employed on spur or helical gears, also. For the purpose of chamfering these two latter types of gears, it may be necessary in some cases to construct a machine more suitable for the purpose, but the same chamfering motion can be employed in chamfering spur or helical gears as bevels. Moreover in chamfering these gears, the blank may be driven at a varying velocity as already described.

While I have described a particular embodiment of the invention, it will be understood that the invention is not limited to this embodiment, but that this applicaion is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of chamfering the ends of gear teeth which comprises positioning a cutting tool in engagement with a gear so that its cutting edge is inclined to a side surface of a tooth of the gear, and moving the tool in a curved path and in a direction following generally along the profile of the tooth.

2. The method of chamfering the ends of gear teeth which comprises positioning a cutting tool in engagement with a gear so that its cutting edge is inclined to a side surface of a tooth of the gear, and imparting an arcuate swinging movement to the tool to cause its cutting edge to move in a direction following generally along the profile of the tooth, and indexing the gear between alternate strokes of the tool.

3. The method of chamfering the teeth of a gear which comprises bringing an oscillating cutting tool having a side cutting edge which is inclined to its axis of oscillation and a gear into operative relation with the axis of oscillation of the tool inclined at an acute angle to one end face of the gear and swinging the tool along the length of the profiles of the gear teeth to cause the tool to chamfer one side of the teeth at one end thereof.

4. The method of chamfering the teeth of a gear which comprises adjusting an oscillatory cutting tool, which has a cutting edge at one side inclined to its axis of oscillation and whose side face is relieved back of said cutting edge, into cutting relation with a gear, and swinging the tool along the length of the profiles of the teeth of the gear to chamfer the teeth.

5. In a machine for chamfering gears, a work support adapted to carry the gear to be chamfered, an oscillatory tool support, a tool mounted thereon having a cutting edge at one side thereof and having said side relieved back of said cutting edge, means for adjusting the tool and work supports into operative relation so that the axis of swing of the tool support is inclined at an acute angle to one end face of the gear, and means for swinging the tool support about its axis to move the tool along the length of tooth profiles of the gear.

6. In a machine for chamfering gears, a work support adapted to carry the gear to be chamfered, an oscillatory tool support, a tool mounted thereon, means for adjusting the tool and work supports into operative relation, means for oscillating the tool support on its axis, means for effecting an alternate relative movement of feed and withdrawal between the tool and work supports, to alternately bring the tool into cutting position and move it therefrom, and means for rotating the work support at a relatively slow speed while the tool is in cutting position and at a relatively high speed when the tool is withdrawn from cutting position whereby to index the gear during the periods of withdrawal.

7. In a machine for chamfering gears, a work support, an oscillatory tool support, a tool mounted thereon, means for adjusting the tool support relative to the work support so that the tool in its swing will move along the length of profiles of the teeth of the gear, means for oscillating the tool support on its axis, means for producing an alternate relative movement of the tool and work supports toward and away from one another to alternately bring the tool into cutting position and move it therefrom, and means for rotating the work support continuously at a varying velocity, said last-named means operating to drive the work support at a relatively slow speed while the tool is in cutting position and at a relatively high speed when the tool is withdrawn from cutting position whereby to index the gear during the periods of withdrawal.

8. In a machine for chamfering gears, a work support, an oscillatory tool support, a tool mounted on said tool support having a side cutting edge inclined to the axis of swing of the tool support and having its side relieved back of said cutting edge, means for adjusting the tool support relative to the work support so that the tool in its swing will move along the length of profiles of the gear, means for oscillating the tool support on its axis, means for producing an alternate relative movement of the tool and work supports toward and away from each other to alternately bring the tool into cutting position and move it therefrom, and means for rotating the work support continuously at a varying velocity, said last named means operating to drive the work support at a relative slow speed while the tool is in cutting position and at a relatively high speed when the tool is withdrawn from cutting position whereby to index the gear during the periods of withdrawal.

9. In a machine for chamfering gears, a work support adapted to carry the gear to be chamfered, a tool support, means for imparting a cutting motion to the tool, means for effecting an alternate relative movement of feed and withdrawal between the tool and work support, and means for rotating the work support at a varying velocity to cause the work spindle to rotate slowly during operation of the tool and more rapidly when the tool has been withdrawn from engagement with the work, whereby to index the work support.

10. In a machine for chamfering gears, a work support adapted to carry the gear to be chamfered, a tool support, means for oscillating the tool support about an axis inclined to one end face of the gear, means for effecting an alternate relative movement of feed and withdrawal between the tool and work support, means for rotating the work support at a varying velocity to cause the work support to rotate slowly during operation of the tool and more rapidly when the tool has been withdrawn from engagement with the work whereby to index the work support.

11. In a machine for chamfering gears, a work support adapted to carry the gear to be chamfered, an oscillatory tool support, means for adjusting the work and tool supports into operative relation with the axis of the tool support inclined to one end face of the gear teeth, means for oscillating the tool support, and means for rotating the work support at a varying velocity to cause the work support to rotate slowly during the cutting stroke of the tool and more rapidly during the return stroke of the tool, whereby the work support is indexed during the latter movement.

12. In a machine for chamfering tapered gears having longitudinally inclined teeth, a work support adapted to carry the gear to be chamfered, a pair of oscillatory tool supports, cutting tools mounted on said tool supports, means for adjusting said tool and work supports to adjust the tools, respectively, into operative relation with opposite sides of the teeth of the gear at opposite ends of the teeth, means for oscillating said tool supports to move the tools, respectively, along the length of opposite tooth profiles of the gear, and means for indexing the work support.

13. In a machine for chamfering tapered gears having longitudinally inclined teeth, a work support, a pair of oscillatory tool supports, tools mounted thereon, means for adjusting the tool and work supports to bring the tools, respectively, into operative relation with opposite sides of the teeth of the gear to be chamfered at opposite ends of its teeth, means for producing alternate relative movements of the tool supports toward and away from the work support, means for simultaneously oscillating the two tool supports, and means for rotating the work support continuously at a varying velocity to drive the work support at a relatively slow speed while the tools are in cutting position and at a relatively fast speed when the tools are withdrawn, whereby to index the work support during the periods of withdrawal.

14. In a machine for chamfering tapered gears having longitudinally inclined teeth, a work support, a pair of oscillatory tool supports, tools mounted thereon, means for adjusting the tool and work supports to adjust the tools, respectively, into operative relation with opposite sides of the teeth at opposite ends of the teeth, means for simultaneously oscillating the two tool supports, means for moving the two tool supports at the same time alternately toward and from the work supports axially of their respective axes of oscillation, and means for rotating the work support continuously at a varying velocity to drive the work at a relatively slow speed while the tools are in cutting position and at a relatively fast speed when the tools are withdrawn, whereby to index the work support during periods of withdrawal.

15. In a machine for chamfering tapered gears having longitudinally inclined teeth, a work support adapted to carry the gear to be chamfered, a pair of tool supports, oscillatable cutting tools mounted on said supports, means for positioning said tool supports relative to the work support so that the axes about which the tools oscillate are inclined to opposite end faces of the gear teeth, means for simultaneously oscillating the tools to effect alternate cutting and return strokes of the tools, means for simultaneously withdrawing the tools from engagement with the work after each cutting stroke, and means for simultaneously returning the tools into engagement with the work at the ends of their return strokes, and means for indexing the work during the return strokes of the tools.

16. In a machine for chamfering gears, a work support adapted to carry the gear to be chamfered, an oscillatory tool support, a tool mounted thereon, means for adjusting the tool support relative to the work support so that the tool in its swing will move along the length of tooth profiles of the gear, means for alternately moving the tool support axially toward and from the work support to move the tool alternately to and from cutting position, means for oscillating the tool support and means for indexing the work support during the periods of withdrawal of the tool from cutting position.

17. In a machine for chamfering gears, a work support, an oscillatory tool support, a tool mounted thereon having a side cutting edge inclined to the axis of swing of the tool support and having its side relieved back of said cutting edge, means for adjusting the tool support relative to the work support so that the tool in its swing will move along the length of tooth profiles of the teeth of the gear, means for oscillating the tool support, means for reciprocating the tool support axially of its axis of oscillation to move the tool alternately to and from cutting position, and means for indexing the work support during the periods of withdrawal of the tool from cutting position.

18. In a machine for chamfering gears, a work support, an oscillatory tool support, means for adjusting the tool support relative to the work support so that the tool in its swing will move along the length of profiles of the teeth of the gear, means for oscillating the tool support, means for reciprocating the tool support axially of its axis of oscillation to move the tool alternately to and from cutting position, and means for rotating the work support at a varying velocity to drive the work support at a relatively slow speed during cutting and a relatively fast speed during the periods of tool withdrawal whereby to index the gear during said periods.

19. In a machine for chamfering longitudinally curved tooth tapered gears, an indexable work support adapted to carry the gear to be chamfered, means for adjusting the work support angularly in accordance with the pitch cone angle of the gear to be chamfered, a pair of oscillatory tool supports, means for adjusting the tool supports to bring them, respectively, into operative relation with opposite side faces of a tooth of a gear at opposite ends thereof with their axes inclined to the top face and to opposite ends, respectively, of the gear teeth, separate mechanisms operable to oscillate said tools, and a common drive means for said mechanisms and the work support.

20. In a machine for chamfering gears, a work support adapted to carry the gear to be chamfered, an oscillatory tool support, means for adjusting the tool support relative to the work support so that on the cutting stroke, the tool travels in the general direction of the profile of a tooth, means for oscillating the tool support, and means for rotating the work support at a varying velocity to cause it to rotate at a relatively slow speed during the cutting stroke of the tool and at a more rapid rate during the return stroke of the tool whereby to index the work during said return stroke.

21. In a machine for chamfering tapered gears, a frame, a work support adjustable axially and angularly on the frame, a pair of tool supports, each of which is mounted on the frame for adjustment rectilinearly in two directions at right angles to one another, but one of which is adjustable in directions inclined to the directions of adjustment of the other tool support, means for oscillating the tool supports to move the tools along profiles of the teeth of the gear, means for producing relative movements of the tool supports alternately toward and from the work support, and means for indexing the work support during the periods of withdrawal.

22. In a machine for chamfering gears, a sleeve, a tool support mounted in the sleeve coaxially thereof, a tool mounted on the tool support adapted to cut when swung in one direction, means for oscillating one of the two first named parts to impart alternately cutting movements to the tool and return the same for subsequent operations, means for reciprocating the other of said two first named parts to alternately move the tool into operative position for each cutting stroke and withdraw it therefrom for the return strokes, and means for indexing the gear on the return strokes.

MAXWELL H. HILL.